United States Patent
Nolan et al.

(10) Patent No.: US 9,954,729 B1
(45) Date of Patent: Apr. 24, 2018

(54) PROVISIONING AND CONFIGURATION OF NETWORK INFRASTRUCTURE EQUIPMENT

(71) Applicant: T-Mobile USA, Inc., Bellevue, WA (US)

(72) Inventors: Patrick Nolan, Concord, CA (US); Alok Jani, Concord, CA (US); Chris Lugos, Concord, CA (US)

(73) Assignee: T-MOBILE USA, INC., Bellevue, WA (US)

( * ) Notice: Subject to any disclaimer, the term of this patent is extended or adjusted under 35 U.S.C. 154(b) by 71 days.

(21) Appl. No.: 14/948,090

(22) Filed: Nov. 20, 2015

(51) Int. Cl.
 *H04L 12/24* (2006.01)
 *H04L 12/26* (2006.01)
 *H04L 29/08* (2006.01)
 *H04L 1/00* (2006.01)

(52) U.S. Cl.
 CPC ........ *H04L 41/0803* (2013.01); *H04L 1/0041* (2013.01); *H04L 41/06* (2013.01); *H04L 43/045* (2013.01); *H04L 67/36* (2013.01)

(58) Field of Classification Search
 CPC ... H04L 41/0803; H04L 41/06; H04L 1/0041; H04L 43/045; H04L 67/36; H04W 4/001; H04W 4/12; H04W 4/16; H04W 4/18; H04W 24/00
 See application file for complete search history.

(56) References Cited

U.S. PATENT DOCUMENTS

| | | | |
|---|---|---|---|
| 8,306,517 B2 * | 11/2012 | Page | H04W 24/02 455/418 |
| 9,094,299 B1 * | 7/2015 | Rao D.S. | H04L 41/0803 |
| 2012/0094658 A1 * | 4/2012 | Macias | H04W 4/001 455/426.1 |
| 2015/0237637 A1 * | 8/2015 | Venkatraman | H04W 72/082 370/329 |
| 2016/0142292 A1 * | 5/2016 | Au | H04L 5/0007 370/352 |

* cited by examiner

*Primary Examiner* — Min Jung
(74) *Attorney, Agent, or Firm* — Knobbe, Martens, Olson & Bear, LLP

(57) ABSTRACT

Traditional configuration of infrastructure equipment relates to the manual generation of properties and corresponding scripts that was time consuming and had potential errors. A tool for provisioning and configuring network infrastructure equipment is provided. The tool utilizes pre-configured templates to collect information utilized in the configuration of the infrastructure equipment and automatically generate configuration scripts. The tool dramatically increases the ability to configure or re-configure infrastructure equipment.

21 Claims, 8 Drawing Sheets

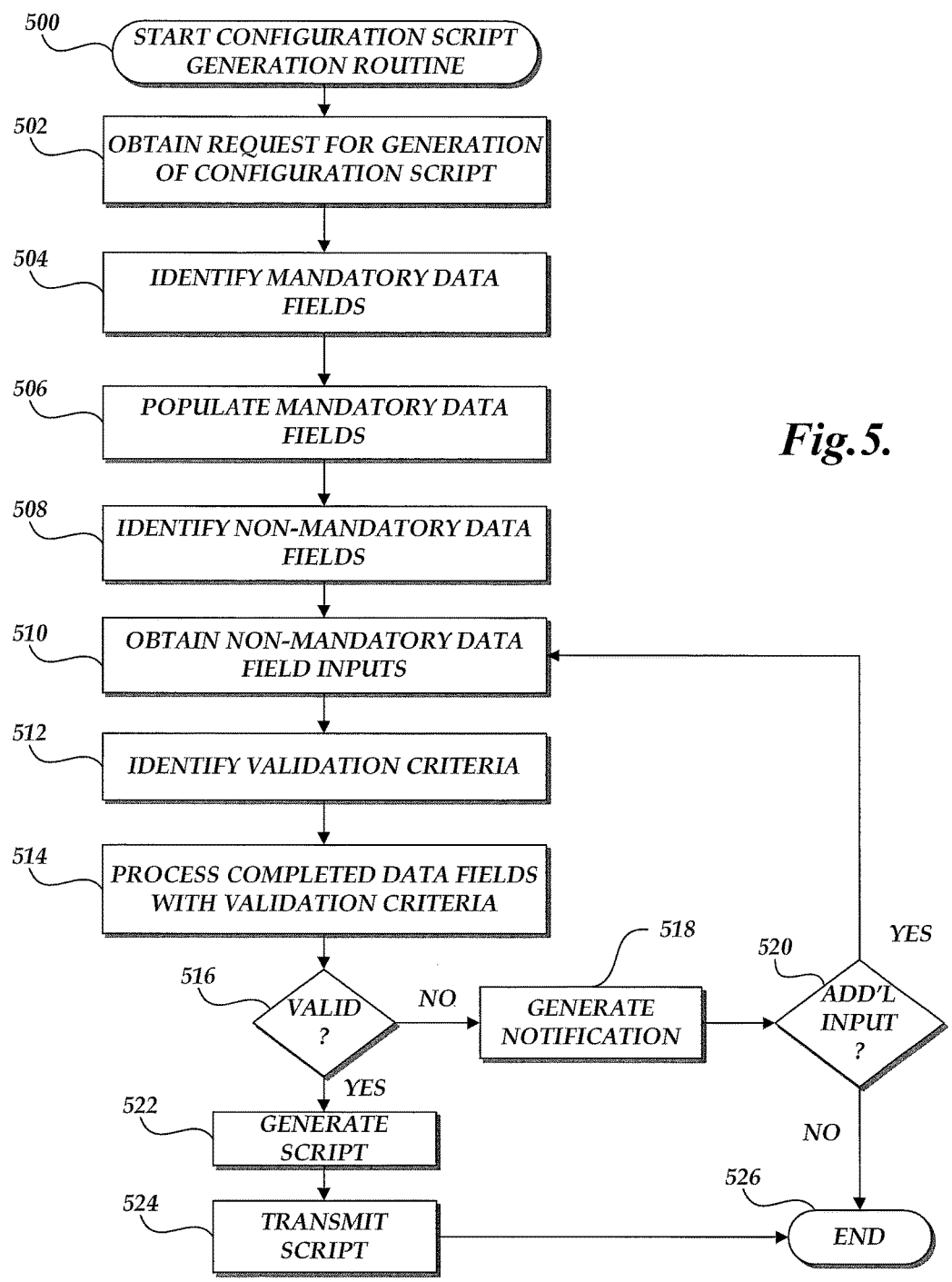

PROVISIONING AND CONFIGURATION OF NETWORK INFRASTRUCTURE EQUIPMENT

BACKGROUND

Generally described, communication networks include various equipment to facilitate the operation of the communication network. In the context of a wireless communication network, a network service provider can provision network infrastructure equipment at various geographic locations to facilitate transmission and processing of wireless signals exchanged with mobile devices. In most wireless communication networks, various aspects of the infrastructure equipment can be configured based on utilization of software interfaces and applications that adjust the operation of the infrastructure equipment.

In some implementations, the configuration of infrastructure equipment can be accomplished by a manual selection of various data values and the generation of executable code, such as script, that can be executed by the infrastructure equipment to modify the operating aspects of the infrastructure equipment. However, errors associated with the selection of the data values, such as by selection of incompatible data values, can cause an incorrect or incompatible configuration of the infrastructure equipment.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein:

FIG. 5 is a flow diagram illustrative of a configuration script processing routine implemented by an infrastructure configuration service.

DETAILED DESCRIPTION

Generally described, the present application relates to the configuration of network infrastructure equipment. More specifically, aspect of the present application relate to the configuration of infrastructure equipment utilizing data templates and configuration rules for obtaining data inputs, generating configuration scripts and causing configuration of infrastructure equipment. By utilizing the data templates and configuration rules, a system can mitigate the selection of incompatible configuration scripts and data entry errors associated with necessary information.

In accordance with an illustrative embodiment, a system is provided for facilitating the generation of information for configuring infrastructure equipment. The system utilizes various data templates and configuration rules to facilitate the selection of appropriate data templates for use in configuring selected infrastructure equipment. For specified infrastructure equipment, the system can limit or otherwise filter data templates that are considered to be incompatible on non-optimal.

With continued reference to the illustrative example, once a template has been selected, the system can utilize pre-configured data to populate a set of data fields. In some embodiments, this information can be characterized as engineering data that is required for the configuration of the data template. Additionally, the system can also prompt users to include additional information that can be included in the data template, but is not necessarily considered mandatory for the processing of the data template. Once the necessary information has been pre-populated and obtained, the system then utilizes additional configuration rules to validate whether the data in the template is correct. The validation rules are processed to avoid incorrect or inconsistent configurations that would otherwise be generated. Based on a successful processing of the validation rules, the system can then generate executable code, such as script, that is executed by infrastructure equipment to configure one or more aspects of the operation of the infrastructure equipment.

Although various aspects of the embodiments described in the present disclosure will focus, for purposes of illustration, on the remote processing of dynamic content associated with a web browser, one skilled in the art will appreciate that the techniques disclosed herein may be applied to any number of software processes or applications. Further, although various aspects of the disclosure will be described with regard to illustrative examples and embodiments, one skilled in the art will appreciate that the disclosed embodiments and examples should not be construed as limiting.

Figure 1:
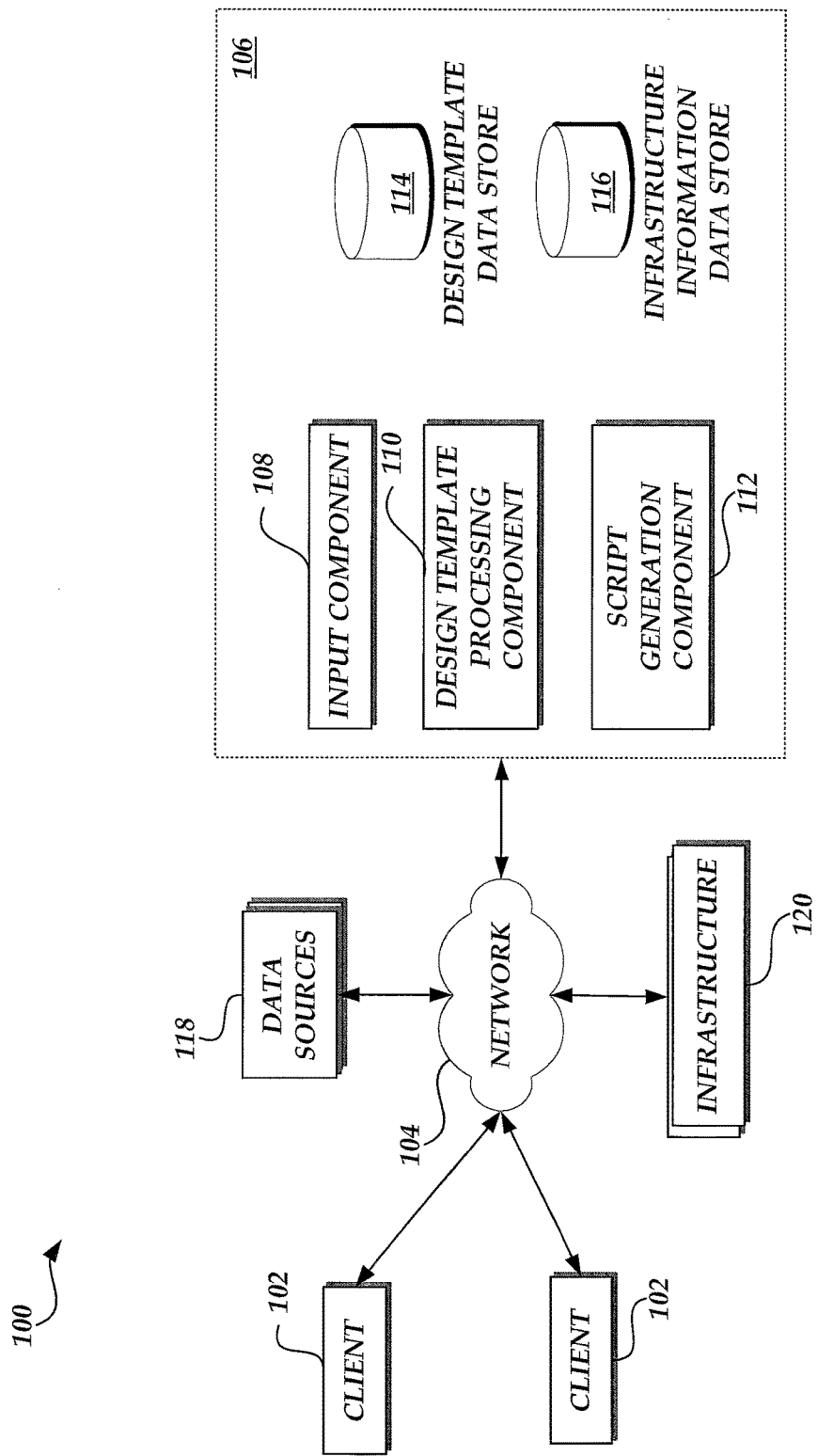
FIG. 1 is a schematic block diagram of an illustrative communication network topology including one or more client computing devices, one or more third party data sources, one or more infrastructure equipment, and an infrastructure configuration service.

FIG. 1 is a block diagram illustrative of a networked computing environment 100 for managing infrastructure equipment in accordance with the present disclosure. As illustrated in FIG. 1, the networked computing environment 100 includes one or more client computing devices 102 ("client") operable to transmit requests for configuration of network infrastructure equipment and provide information related to the configuration of network infrastructure equipment via a communications network 104.

In an illustrative embodiment, the client 102 can correspond to a wide variety of computing devices including personal computing devices, laptop computing devices, hand-held computing devices, terminal computing devices, mobile devices (e.g., mobile phones, tablet computing devices, etc.), wireless devices, various electronic devices and appliances, and the like. The client 102 includes necessary hardware and software components for establishing communications over the communications network 104. For example, the client 102 may be equipped with a network interface that facilitates communications via the network 104. The network 104 can be a publicly accessible network of linked networks, possibly operated by various distinct parties, such as the Internet. In other embodiments, the network 140 may include a private network, local area network ("LAN"), wide area network ("WAN"), cable network, satellite network, wireless telecommunications network, any other medium of computer data transfer, or some combination thereof. The client 102 may also have varied local computing resources such as a central processing unit, data store, input/output devices, a bus interface, memory, and so forth.

The networked computing environment 100 may also include an infrastructure configuration service 106 for obtaining data inputs related to infrastructure equipment or implementation of infrastructure equipment and generation of executable code, such as scripts, that can cause various configuration changes in infrastructure equipment. As illustrated in FIG. 1, the infrastructure configuration service 106 can include an input component 108 or application for obtaining information from client 102, networked data stores, local data stores, or third party data providers. The infrastructure configuration service 106 can further include a design template processing component 110 or application for processing received data according to a selected template and validating data received to be processed in a template. The infrastructure configuration service 106 can further include a script generation component 112 or application for utilizing a completed, validated data template to generate the executable code utilized by the infrastructure equipment.

Illustratively, the infrastructure configuration service 106 can be implemented on one or more physical computing devices. The physical computing devices include necessary hardware and software components for implementing the components/applications identified above as well as other applications or components. Such local computing resources such as a central processing unit, data store, input/output devices, a bus interface, memory, and so forth. Additional software such as networking software, virtualization software, operating_system, and other applications are further included in the physical computing device.

The infrastructure configuration service 106 can also include or be associated with a design template data store 114 and an infrastructure equipment data store that provide the design templates and pre-determined data utilized in the generation of configuration scripts. One skilled in the relevant art will appreciate that will the data stores 114 and 116 are depicted as a single data store, the data stores may encompass multiple data stores implemented in a distributed manner, a centralized manner or a combination thereof.

With continued reference to FIG. 1, the networked computing environment 100 can further include various third party data sources 118 for transmitting data utilized in the processing of design templates. Additionally, as illustrated in FIG. 1, the networked computing environment 100 can further include a set of infrastructure equipment the form at least a portion of a wireless communication network and which receive and process configuration scripts generated by the infrastructure configuration service 106.

Further, the modules or components illustrated in FIG. 1 may include additional components, systems, and subsystems for facilitating the methods and processes. For example, in various embodiments, the client 102 may be centralized in one computing device, distributed across several computing devices, implemented by one or more virtual machine instances, or distributed through a network. Likewise, the infrastructure configuration service 106 may be implemented in or more physical computing devices, virtual computing devices, and the like.

Figure 2:
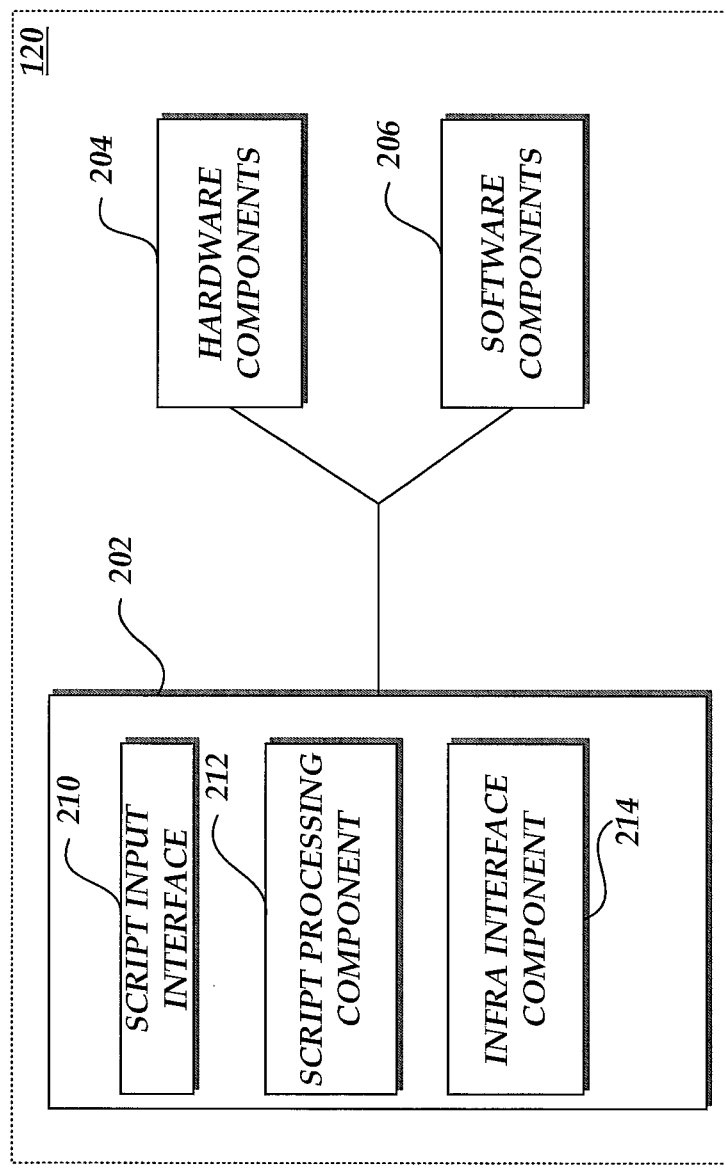
FIG. 2 is a schematic block diagram of an illustrative infrastructure equipment including a configuration application.

With reference now to FIG. 2, a schematic block diagram of illustrative infrastructure equipment 120 including a configuration application 202 will be described. Illustratively, infrastructure equipment 120 can be embodied in a variety of communication network equipment and combination of communication network equipment. For purposes of the present application, the various hardware and software functionality of infrastructure equipment will not be described in detail. Rather, illustrative aspects of the functionality of infrastructure equipment to obtain and process executable code provided by the infrastructure configuration service 106 will be described.

The infrastructure equipment 120 includes necessary hardware and software components for establishing communications over the communications network 104. For example, the infrastructure equipment 120 may be equipped with a network interface that facilitates communications via the network 104. The infrastructure equipment 120 may also have varied local computing resources such as a central processing unit, data store, input/output devices, a bus interface, memory, and so forth. As illustrated in FIG. 1, the infrastructure equipment 120 can include a script processing service/application 202. The functionality of the script processing service 202 can include a script input interface 210 or application for obtaining executable code or other information from the infrastructure configuration service 106. The script processing service 202 can further include a script processing component 212 or application for processing the data received in configuration scripts and identifying modifications or changes to various hardware or software aspects of the infrastructure equipment 120. The script processing service 106 can further include an interface component 214 or application for causing modifications to hardware 204 or software 206 components utilized in the operation of the infrastructure equipment 120. One skilled in the art will appreciate that the infrastructure equipment may have more or fewer components than those depicted in illustrative FIG. 2.

Figure 3A:
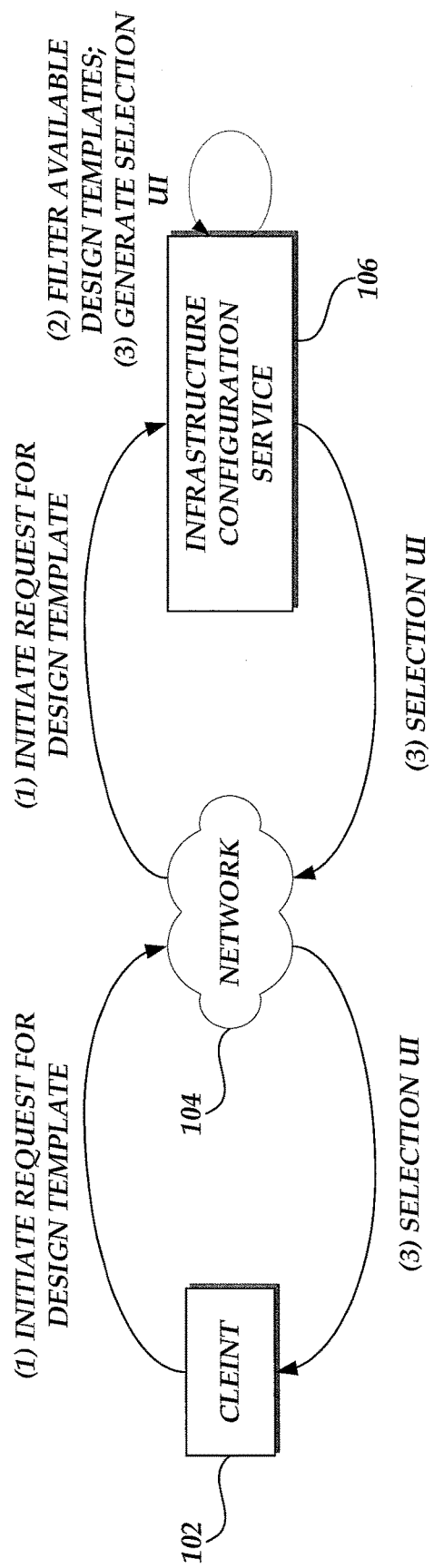
FIGS. 3A-3D are schematic block diagrams of the communication network of FIG. 1 illustrating the generation and processing of a configuration script for infrastructure equipment.

With reference now to FIGS. 3A-3D, block diagrams of the network topology of FIG. 1 illustrating the creation and configuration of infrastructure equipment will be described. With reference to FIG. 3A, at (1), a client 102 initiates the process by transmitting a request for the selection of a design template. Illustratively, the process may be instantiated by selection a control of a graphical user interface generated by an application on the client 102. The process may also be instantiated as part of integrated process related to provisioning infrastructure equipment. The request can illustratively include information sufficient to identify the infrastructure equipment to be configured, the user requesting the configuration and one or more data sources that will be utilized to configure the infrastructure equipment. In other embodiments, profile information accessed via authentication may also be the source of at least a portion of the information. For example, user configuration profiles can identify processing rules and data sources without requiring specification in the request.

At (2), the infrastructure configuration service 106 receives the request and processes the request to determine one or more design templates. In one embodiment, the infrastructure configuration service 106 can identify data templates that are available for use in configuration. Additionally, the infrastructure configuration service 106 can filter out any data templates that would not be compatible or that have otherwise been excluded for use in the configuration of particular infrastructure equipment or types of infrastructure equipment. In other examples, the infrastructure configuration service 106 can also obtain external data, such as time of day, weather conditions, network congestion characterizations, which may be utilized to filter data templates. For example, the infrastructure configuration service 106 can determine that a data template utilized for light network conditions may be excluded based on a characterization of heavy communication network conditions or forecasted heavy communication conditions. In another example, the infrastructure configuration service 106 can obtain information regarding the availability or validation of third party data sources 118 that are required to be used in particular data templates. If the third party data sources 118 are not available, or if the third party data sources are considered not reliable (e.g., based on an attributed error rate or characterization of invalid or incomplete data), the infrastructure configuration service 106 can filter the corresponding data templates as unavailable.

At (3), the infrastructure configuration service 106 generates a user interface corresponding to a selection of one or more data templates that are available to be utilized in the configuration of the selected infrastructure equipment 120.

Figure 3B:
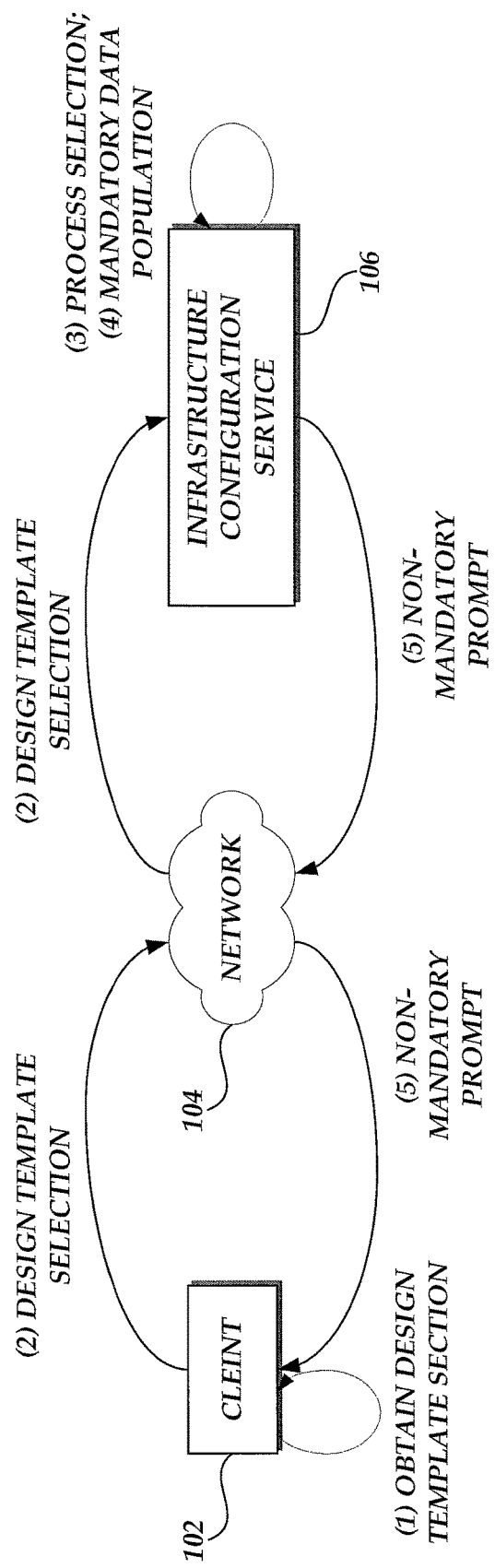

Turning to FIG. 3B, at (1) the client 102 generates the user interface identifying the available design templates and at (2), obtains a selection of a design template to use for configuration. Illustratively, the selection of a design template can be accomplished via a graphical selection, such as a drop down menu.

Generally described, portions of the data fields utilized in the data templates can be characterized as mandatory or "engineering" data that needs to be specified in order for the infrastructure equipment to function properly in a wireless communication network. Such mandatory information can include information identifying the hardware and software components (e.g. radios, antennas, diplexer, basebands, etc.). Mandatory information can also include information identifying the infrastructure equipment within the communication network (e.g., site id, geographic sector information, geographic identifiers or attributes, etc.). Mandatory information can also include information utilized in the communication with devices in the communication network (e.g., radio frequency information, scrambling code, network addressing information, protocol information, etc.). Additionally, portions of the data fields in the data templates can be consider non-mandatory or optional for purposes of operation of the infrastructure equipment even if the service provider may specify that information to be provided. Such non-mandatory data fields can include asset identification information, geographic identifiers, financial information, user assignments, and the like. Additional or alternative information may be characterized as either mandatory or non-mandatory in specific data fields.

At (3), the infrastructure configuration service 106 processes the selected data template by accessing the design template data store 114. At (4), the infrastructure configuration service 106 then pre-populates the selected design at least information designated as mandatory. Illustratively, the infrastructure configuration service 106 can utilize the configuration information data store 116, which can maintain the mandatory information. Accordingly, the user of the client 102 is not required or allowed to enter mandatory information as part of the configuration process. The data utilized to complete the mandatory data fields can be associated with the selected infrastructure equipment, previously configured infrastructure equipment, network profiles, or user profiles. For example, the infrastructure configuration service 106 can utilize common information associated with the network profile to pre-populate network identification information for a set of infrastructure equipment. At (5), the infrastructure configuration service 106 can then generate prompts or user interfaces to request the non-mandatory information or validation of the mandatory information that was pre-populated.

Figure 3C:
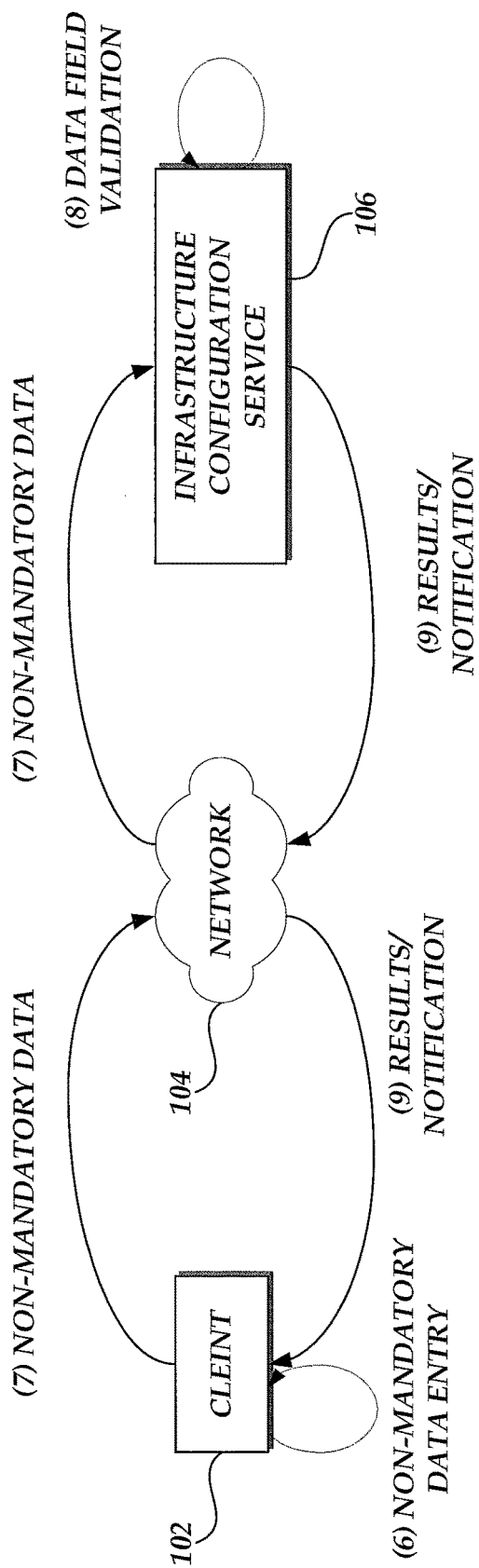

Turning now to FIG. 3C, at (6), a user of a client 102 can enter non-mandatory information or otherwise specify a third party data source 118. The resulting information is transmitted at (7) to the infrastructure configuration service 106. At (8), the infrastructure configuration service 106 processes the data template according to configuration rules to validate that the mandatory and non-mandatory data. Illustratively, the configuration rules associated with a selected design template can determine whether the specification of particular data field values are incorrect, such as by exceeding a threshold or acceptable range. For example, a data field value associated with signal strength specification for infrastructure equipment mounted on top of building can be identified as being incompatible with geographic identification. The validation process may be emphasized if the infrastructure configuration service 106 has not filtered out data templates. Additionally, the configuration rules may analyze combination of data fields that would otherwise be valid data fields. For example, a combination of mechanical tilt angle and signal strength may yield sub-optimal performance or cause interference even though the mechanical tilt angle and the signal strength may be considered valid data fields individually. The results of the validation and processing are transmitted at (9). The process of data submission can be repeated for any identified errors.

Figure 3D:
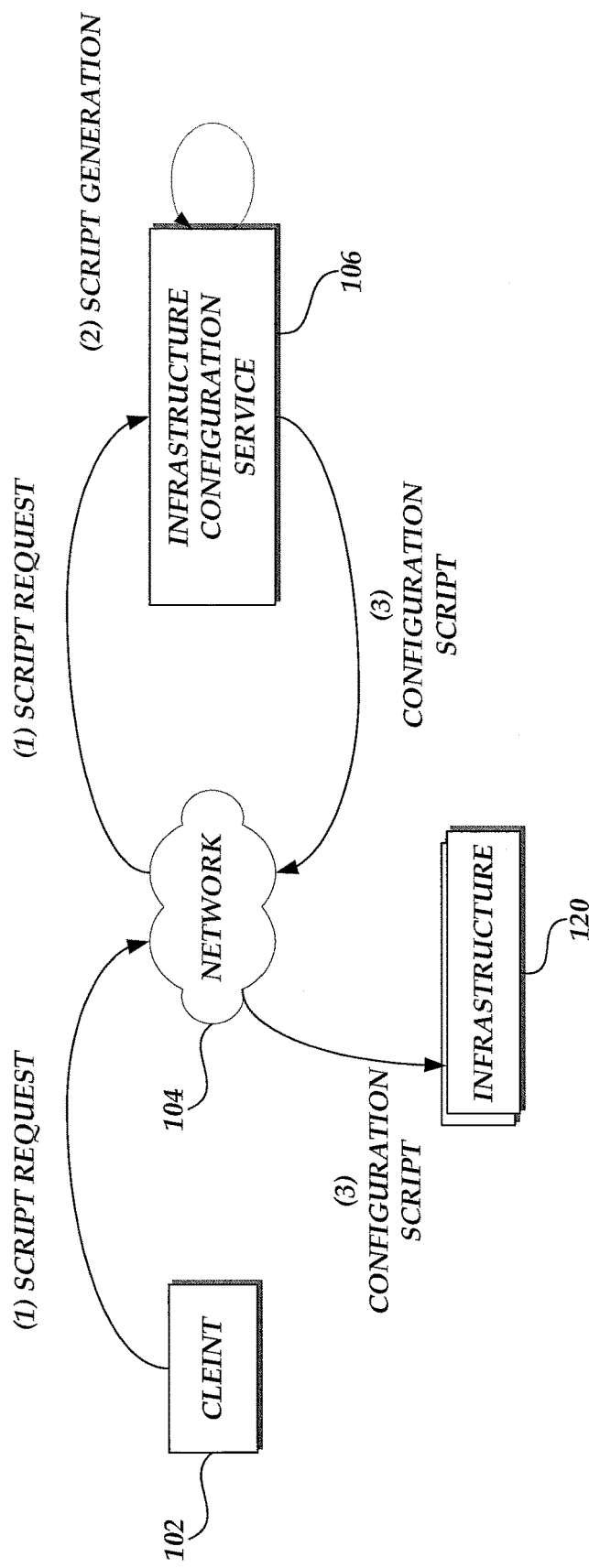

With reference now to FIG. 3D, at (1), a user at the client 102 can optionally request the generation of the script subsequent to a confirmation of a valid processing. Alternatively, the infrastructure configuration service 106 can also cause the generation of the script automatically or as part of profile. At (2), the infrastructure configuration service 106 then generates executable code, such as script, that can be processed by infrastructure equipment to cause the modification of the hardware and software components utilized in the hosting of network communications. At (3), the infrastructure configuration service 106 transmitted the appropriate scripts to the various infrastructure equipment 120 (directly or indirectly). The receiving infrastructure equipment 120 can then execute the executable code and based on the information specified in the configuration executable code cause the modification of one or more aspects of the infrastructure equipment.

Figure 4:
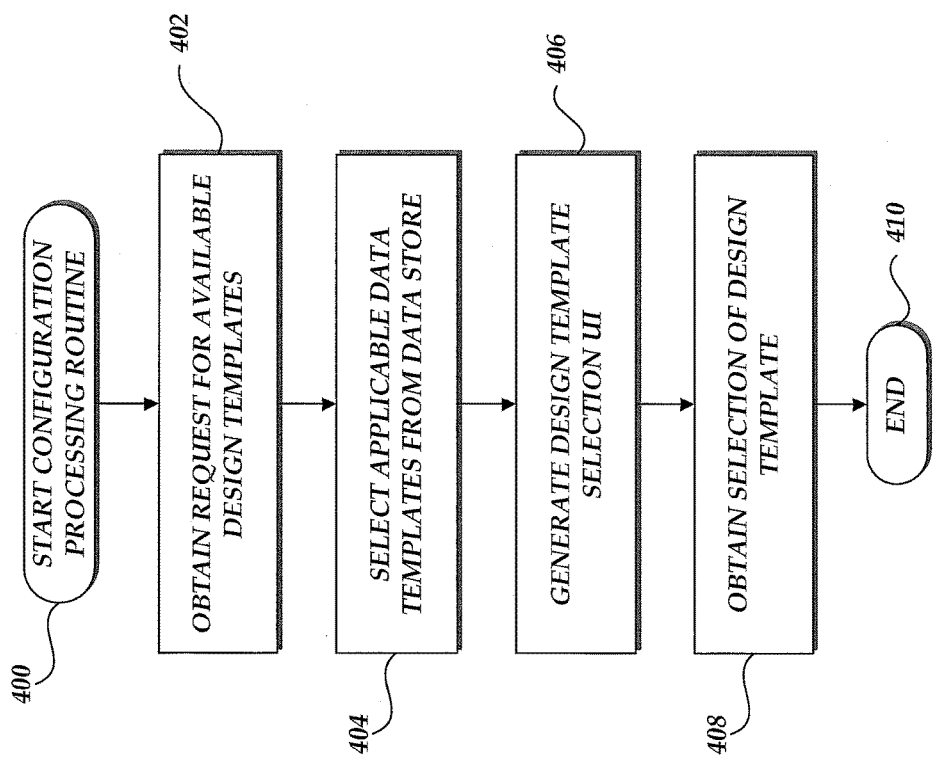
FIG. 4 is a flow diagram illustrative of an infrastructure configuration information processing routine implemented by an infrastructure configuration service.

FIG. 4 is a flow diagram illustrative of an infrastructure configuration information processing routine 400 implemented by an infrastructure configuration service 106. At block 402, the infrastructure configuration service 106 obtains a request for a design template. As described above, a client 102 initiates the process by transmitting a request for the selection of a design template. Illustratively, the process may be instantiated by selection a control of a graphical user interface generated by an application on the client 102. The process may also be instantiated as part of integrated process related to provisioning infrastructure equipment. The request can illustratively include information sufficient to identify the infrastructure equipment to be configured, the user requesting the configuration and one or more data sources that will be utilized to configure the infrastructure equipment. In other embodiments, profile information accessed via authentication may also be the source of at least a portion of the information. For example, user configuration profiles can identify processing rules and data sources without requiring specification in the request.

At block 404, the infrastructure configuration service 106 can identify data templates that are available for use in configuration. Additionally, the infrastructure configuration service 106 can filter out any data templates that would not be compatible or that have otherwise been excluded for use in the configuration of particular infrastructure equipment or types of infrastructure equipment. In other examples, the infrastructure configuration service 106 can also obtain external data, such as time of day, weather conditions, network congestion characterizations, which may be utilized to filter data templates. For example, the infrastructure configuration service 106 can determine that a data template utilized for light network conditions may be excluded based on a characterization of heavy communication network conditions or forecasted heavy communication conditions. In another example, the infrastructure configuration service 106 can obtain information regarding the availability or validation of third party data sources 118 that are required to be used in particular data templates. If the third party data sources 118 are not available, or if the third party data sources are considered not reliable (e.g., based on an attributed error rate or characterization of invalid or incomplete data), the infrastructure configuration service 106 can filter the corresponding data templates as unavailable.

At block 406, the infrastructure configuration service 106 generates a user interface corresponding to a selection of one or more data templates that are available to be utilized in the configuration of the selected infrastructure equipment 120. At block 408, the infrastructure configuration service 106 obtains the selection of a design template that will be the basis of the infrastructure configuration. At block 410, the routine 400 terminates.

As described previously, once a design template has been selected, the infrastructure configuration service 106 can process the selected design template with associated information to generate the configuration script. With reference now to FIG. 5, a flow diagram illustrative of a configuration script processing routine 500 implemented by an infrastructure configuration service 106 will be described. Portions of the data fields utilized in the data templates can be characterized as mandatory or "engineering" data that needs to be specified in order for the infrastructure equipment to function properly in a wireless communication network. Mandatory information can include information identifying the hardware and software components (e.g. radios, antennas, diplexer, basebands, etc.). Mandatory information can also include information identifying the infrastructure equipment within the communication network (e.g., site id, geographic sector information, geographic identifiers or attributes, etc.). Mandatory information can also include information utilized in the communication with devices in the communication network (e.g., radio frequency information, scrambling code, network addressing information, protocol information, etc.). Additionally, portions of the data fields in the data templates can be consider non-mandatory or optional for purposes of operation of the infrastructure equipment even if the service provider may specify that information to be provided. Such non-mandatory data fields can include asset identification information, geographic identifiers, financial information, user assignments, and the like. Additional or alternative information may be characterized as either mandatory or non-mandatory in specific data fields.

At block 502, the infrastructure configuration service 106 identifies the data fields in the selected design template that are designated as mandatory. For example, the design templates can include meta-data or other identifying characteristics. At block 504, the infrastructure configuration service 106 then pre-populates the selected design at least information designated as mandatory. Illustratively, the infrastructure configuration service 106 can utilize the configuration information data store 116, which can maintain the mandatory information. Accordingly, the user of the client 102 is not required or allowed to enter mandatory information as part of the configuration process. The data utilized to complete the mandatory data fields can be associated with the selected infrastructure equipment, previously configured infrastructure equipment, network profiles, or user profiles. For example, the infrastructure configuration service 106 can utilize common information associated with the network profile to pre-populate network identification information for a set of infrastructure equipment.

At block 508, the infrastructure configuration service 106 can then generate prompts or user interfaces to request the non-mandatory information or validation of the mandatory information that was pre-populated. For example, the infrastructure configuration service 106 can generate a user interface for prompting a user. At block 510, a user of a client 102 can enter non-mandatory information or otherwise specify a third party data source 118. The resulting information is transmitted to the infrastructure configuration service 106.

At block 512, the infrastructure configuration service 106 identifies configuration rules to validate that the mandatory and non-mandatory data of the selected data template. Illustratively, the configuration rules associated with a selected design template can determine whether the specification of particular data field values are incorrect, such as by exceeding a threshold or acceptable range. For example, a data field value associated with signal strength specification for infrastructure equipment mounted on top of building can be identified as being incompatible with geographic identification. The validation process may be emphasized if the infrastructure configuration service 106 has not filtered out data templates. Additionally, the configuration rules may analyze combination of data fields that would otherwise be valid data fields. For example, a combination of mechanical tilt angle and signal strength may yield sub-optimal performance or cause interference even though the mechanical tilt angle and the signal strength may be considered valid data fields individually. At block 514, the infrastructure configuration service 106 process the configuration rules.

At decision block 516, a test is conducted to determine whether the results of the validation rules is positive. If not, at block 518, the infrastructure configuration service 106 generates a notification and determines whether additional inputs are required or allowed. For example, the infrastructure configuration service 106 can generate a notification that one or more data field values are incompatible and prompt for a modification of the data field values. In other embodiments, if the mandatory information results in an error and cannot be adjusted, the routine 500 would fail the process. If additional inputs are allowed, the routine 500 returns to block 510. Alternatively, if no additional inputs are available or desired, the routine 500 terminates at block 526.

Returning again to decision block 516, if the results of the validation are positive, a user at the client 102 can optionally request the generation of the script subsequent to a confirmation of a valid processing. Alternatively, the infrastructure configuration service 106 can also cause the generation of the script automatically or as part of profile. Accordingly, at block 522, the infrastructure configuration service 106 then generates executable code, such as script, that can be processed by infrastructure equipment to cause the modification of the hardware and software components utilized in the hosting of network communications. At block 524, the infrastructure configuration service 106 transmitted the appropriate scripts to the various infrastructure equipment 120 (directly or indirectly). The receiving infrastructure equipment 120 can then implement the configuration script as described above. The routine 500 then terminates or repeats for additional infrastructure equipment 120.

Depending on the embodiment, certain acts, events, or functions of any of the methods described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules and method elements described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The elements of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium known in the art. A storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g." and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," "involving" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A method for generating configuration scripts associated with infrastructure equipment comprising:
   obtaining an identification of infrastructure equipment;
   determining a design template from a set of design templates, based at least in part, on the identification of the infrastructure equipment, the design template defining a set of configuration fields;
   identifying one or more fields of the set of configuration fields as mandatory fields;
   causing an automatic population of the identified one or more mandatory fields, wherein the automatic population is based on pre-processed information without additional input from a user;
   obtaining input from the user regarding at least one additional configuration field in the set of configuration fields not identified as a mandatory field;
   obtaining one or more evaluation criterion, the one or more evaluation criterion defining validation rules for configuration of infrastructure equipment;
   determining whether the set of configuration fields is valid based on an application of the evaluation criterion;
   generating a configuration script based on the set of configuration fields if the set of configuration fields is determined to be valid; and
   causing configuration of at least one infrastructure equipment based on the generated configuration script.

2. The method as recited in claim 1, wherein obtaining an identification of infrastructure equipment includes:
    generating a graphical display of display objects corresponding to a set of available infrastructure equipment;
    obtaining a selection of a display object; and
    selecting infrastructure equipment corresponding to the selected display object.

3. The method as recited in claim 1, wherein determining a design template from a set of design templates includes identifying a subgroup of design templates corresponding to the selected infrastructure equipment.

4. The method as recited in claim 3 further comprising filtering at least one design template based on incompatibility based on the selected infrastructure equipment.

5. The method as recited in claim 1, wherein determining whether the set of configuration fields is valid based on an application of the evaluation criterion includes determining whether one or more acceptable values for at least one field in the set of configuration fields.

6. The method as recited in claim 1, wherein determining whether the set of configuration fields is valid based on an application of the evaluation criterion includes determining whether one or more acceptable values for a combination of fields in the set of configuration fields.

7. The method as recited in claim 1 further comprising generating a notification based on a determination of a failure based on the determining whether the set of configuration fields is valid based on an application of the evaluation criterion.

8. A system for generating configuration scripts associated with infrastructure equipment comprising
    a data store, executed on one or more computing devices having a processor and a memory, the data store maintaining a library of design templates, wherein individual design templates define a set of configuration fields;
    a configuration script generation component, executed on one or more computing devices having a processor and a memory, the configuration script generation component, operable to:
        obtain an identification of infrastructure equipment;
        determine a design template from a set of design templates maintained on the data store, wherein the design template is selected based at least in part, on the identification of the infrastructure equipment, the design template defining a set of configuration fields;
        cause the population of set of configuration fields based on an automatic population of one or more identified mandatory fields, wherein the automatic population is based on pre-processed information and at least one additional configuration field in the set of configuration fields not identified as a mandatory field;
        determine whether the set of configuration fields is valid based on an application of an evaluation criterion; and
        generate a configuration script based on the set of configuration fields if the set of configuration fields is determined to be valid.

9. The system as recited in claim 8, wherein the configuration script generation component is further operable to transmit generation configuration scripts to configure selected infrastructure equipment.

10. The system as recited in claim 8, wherein the configuration script generation component is further operable to obtain a manual manipulation of data utilized in causing the population of the one or more identified mandatory fields.

11. The system as recited in claim 8, wherein the configuration script generation component is further operable to determine an error condition based on the evaluation criterion and generate a notification identifying the error condition.

12. The system as recited in claim 8, wherein the configuration script generation component is further operable to generate a graphical display of display objects corresponding to a set of available infrastructure equipment and select infrastructure equipment corresponding to a selected display object.

13. The system as recited in claim 8, wherein the configuration script generation component determines a design template from a set of design templates includes identifying a subgroup of design templates corresponding to the selected infrastructure equipment.

14. The system as recited in claim 8, wherein the configuration script generation component determines whether the set of configuration fields is valid based on determining whether one or more acceptable values for at least one field in the set of configuration fields.

15. A method for generating configuration scripts associated with infrastructure equipment comprising:
    determining a design template from a set of design templates, based at least in part, on an identification of the infrastructure equipment, the design template defining a set of configuration fields;
    causing population of set of configuration fields based on an automatic population of one or more identified mandatory fields, wherein the automatic population is based on pre-processed information, and at least one additional configuration field in the set of configuration fields not identified as a mandatory field;
    determining whether the set of configuration fields is valid based on an application of an evaluation criterion; and
    generating a configuration script based on the set of configuration fields if the set of configuration fields is determined to be valid.

16. The method as recited in claim 15 further comprising obtaining an identification of infrastructure equipment.

17. The method as recited in claim 16, wherein obtaining an identification of infrastructure equipment includes:
    generating a graphical display of display objects corresponding to a set of available infrastructure equipment;
    obtaining a selection of a display object; and
    selecting infrastructure equipment corresponding to the selected display object.

18. The method as recited in claim 15, wherein determining a design template from a set of design templates includes identifying a subgroup of design templates corresponding to the selected infrastructure equipment.

19. The method as recited in claim 15, wherein determining whether the set of configuration fields is valid based on an application of the evaluation criterion includes determining whether one or more acceptable values for at least one field in the set of configuration fields.

20. The method as recited in claim 15, wherein determining whether the set of configuration fields is valid based on an application of the evaluation criterion includes determining whether one or more acceptable values for a combination of fields in the set of configuration fields.

21. The method as recited in claim 15 further comprising generating a notification based on a determination of a failure based on the determining whether the set of configuration fields is valid based on an application of the evaluation criterion.

* * * * *